(12) United States Patent
Jang et al.

(10) Patent No.: US 11,699,374 B2
(45) Date of Patent: Jul. 11, 2023

(54) DISPLAY DEVICE AND OPERATING METHOD OF THE SAME

(71) Applicant: SAMSUNG ELECTRONICS CO., LTD., Suwon-si (KR)

(72) Inventors: Sungchang Jang, Suwon-si (KR); Beomeun Kim, Suwon-si (KR); Gaewon Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/689,175

(22) Filed: Mar. 8, 2022

(65) Prior Publication Data

US 2022/0246076 A1 Aug. 4, 2022

Related U.S. Application Data

(63) Continuation of application No. PCT/KR2022/001380, filed on Jan. 26, 2022.

(30) Foreign Application Priority Data

Feb. 1, 2021 (KR) .......................... 10-2021-0014338
Apr. 6, 2021 (KR) .......................... 10-2021-0044744

(51) Int. Cl.
*G09G 3/20* (2006.01)

(52) U.S. Cl.
CPC ....... *G09G 3/20* (2013.01); *G09G 2340/0407* (2013.01); *G09G 2340/0442* (2013.01); *G09G 2370/12* (2013.01)

(58) Field of Classification Search
CPC ............. G09G 3/20; G09G 2340/0407; G09G 2340/0442; G09G 2370/12
See application file for complete search history.

(56) References Cited

U.S. PATENT DOCUMENTS

| 10,304,419 | B2 | 5/2019 | Park et al. |
| 10,708,534 | B2 | 7/2020 | Park et al. |
| 2012/0081603 | A1 | 4/2012 | Fukaya et al. |

FOREIGN PATENT DOCUMENTS

| KR | 10-2009-0036760 | 4/2009 |
| KR | 10-2009-0106070 | 10/2009 |

(Continued)

OTHER PUBLICATIONS

Search Report and Written Opinion dated Apr. 28, 2022 issued in InternationalPatent Application No. PCT/KR2022/001380.

*Primary Examiner* — Abbas I Abdulselam
(74) *Attorney, Agent, or Firm* — Nixon & Vanderhye, P.C.

(57) ABSTRACT

Provided is a display device including: an inputter/outputter comprising circuitry configured to request a content providing device to provide content at a first resolution and receive a first image at the first resolution from the content providing device, a display configured to display the first image, a memory storing one or more instructions, and a processor configured to execute the one or more instructions stored in the memory to: change a resolution requested to the content providing device from the first resolution to a second resolution, control the display to receive a second image from the content providing device and display the received second image in response to the change of the requested resolution, determine whether an error occurs in the displayed second image, and change the requested resolution from the second resolution to the first resolution based on an error occurring in the second image.

15 Claims, 11 Drawing Sheets

(56) References Cited

FOREIGN PATENT DOCUMENTS

| | | |
|---|---|---|
| KR | 10-1595882 | 2/2016 |
| KR | 10-2016-0102653 | 8/2016 |
| KR | 10-2018-0014494 | 2/2018 |

DISPLAY DEVICE AND OPERATING METHOD OF THE SAME

CROSS-REFERENCE TO RELATED APPLICATIONS

This application is a continuation of International Application No. PCT/KR2022/001380 designating the United States, filed on Jan. 26, 2022, in the Korean Intellectual Property Receiving Office and claiming priority to Korean Patent Application No. 10-2021-0014338, filed on Feb. 1, 2021, and to Korean Patent Application No. 10-2021-0044744, filed on Apr. 6, 2021, the disclosures of all of which are incorporated by reference herein in their entireties.

BACKGROUND

Field

The disclosure relates to display devices and operating methods thereof, and for example, to a display device for displaying an image provided from a content providing device connected to the display device, and an operating method of the display device.

Description of Related Art

Display devices are devices having a function of displaying an image so that a user can watch. A user can watch a broadcast through a display device. The display device displays on a display a broadcast selected by the user from among broadcast signals transmitted from a broadcasting station. Smart TVs are being provided that not only have a broadcasting function but also provide various types of content. Smart TVs may not be operated manually according to a user's selection but are capable of analyzing content that a user wants and providing the content to the user without the user's intervention.

A display device such as a TV may receive and display an image from a content providing device, such as a set-top box, a Blu-ray disc player, a digital versatile disk (DVD) player, a streaming device, a home theater, or an audio device, when the content providing device is connected to the display device.

The content providing device may output content to the display device, based on an output resolution of the display device. In this case, when the output resolution of the display device is changed, an error may occur in an image displayed on the display device, and a user should recognize the error and maintain the changed output resolution or restore the changed output resolution to the original output resolution.

SUMMARY

Various embodiments of the disclosure provide a display device that automatically analyzes whether an error has occurred in a displayed image received from a content providing device connected to the display device when a resolution of the display device requested to the content providing device is changed, and an operating method of the display device.

Various embodiments of the disclosure also provide a display device capable of informing a user of the occurrence of an error in an image or automatically restoring a requested resolution of the display device and an output resolution of a content providing device to an original resolution when the error has occurred in the image, and an operating method of the display device.

An example embodiment of the disclosure provides a display device including: an inputter/outputter comprising circuitry configured to request a content providing device to provide content at a first resolution and to receive a first image at the first resolution from the content providing device, a display configured to display the first image, a memory storing one or more instructions, and a processor configured to execute the one or more instructions stored in the memory to: change a resolution requested to the content providing device from the first resolution to a second resolution, control the display to receive a second image from the content providing device and display the received second image in response to the change of the requested resolution, determine whether an error occurs in the displayed second image, and change the requested resolution from the second resolution to the first resolution based on an error occurring in the second image.

In an example embodiment of the disclosure, the processor may be further configured to execute the one or more instructions to change the requested resolution, based on an input to switch to a wide screen mode.

In an example embodiment of the disclosure, a first aspect ratio of the first resolution and a second aspect ratio of the second resolution may be different from each other.

In an example embodiment of the disclosure, the processor may be further configured to execute the one or more instructions to compare the first image and the second image with each other to determine whether an error occurs in the second image.

In an example embodiment of the disclosure, the processor may be further configured to execute the one or more instructions to determine that an error occurs in the second image based on image data included in the first image not being included in the second image.

In an example embodiment of the disclosure, the processor may be further configured to execute the one or more instructions to: compare a first aspect ratio of the first image with a second aspect ratio of a region of the second image corresponding to the first image, and determine that an error occurs in the second image based on the first aspect ratio and the second aspect ratio not matching within a specified range.

In an example embodiment of the disclosure, the inputter/outputter may include a high-definition multimedia interface (HDMI), and the first image and the second image may be received from the content providing device through the HDMI.

In an example embodiment of the disclosure, the processor may be further configured to execute the one or more instructions to control the inputter/outputter to transmit information about the requested resolution to the content providing device through extended display identification (EDID) information.

In an example embodiment of the disclosure, the processor may be further configured to execute the one or more instructions to control the display to display an image at the first resolution based an error occurring in the second image.

In an example embodiment of the disclosure, the processor may be further configured to execute the one or more instructions to control the display to output a message notifying occurrence of an error based on the error occurring in the second image.

An example embodiment of the disclosure provides a method of operating a display device that includes: requesting a content providing device to provide content at a first resolution and receiving a first image at the first resolution from the content providing device, displaying the first image, changing a resolution requested to the content providing device from the first resolution to a second resolution, receiving a second image from the content providing device in response to the change of the requested resolution, displaying the received second image, determining whether an error occurs in the displayed second image, and changing the requested resolution from the second resolution to the first resolution based on an error occurring in the second image.

A display device according to an example embodiment of the disclosure is capable of automatically detecting whether an error has occurred in an image displayed at a changed requested resolution and thus is capable of informing a user of even the occurrence of an error that is difficult to recognize or restoring the requested resolution to an original resolution, thereby improving the user's viewing environment.

For example, when the display device is connected to a content providing device that provides game content, an error may be prevented and/or reduced from occurring in the display device due to a display environment when the content providing device supports aspect ratios, e.g., 21:0 and 32:9, specialized for games according to a graphics card or a game title.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
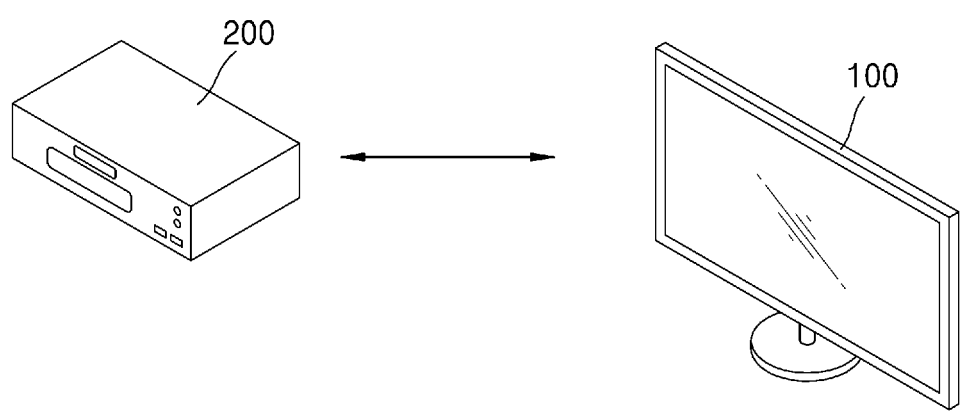
FIG. 1 is a diagram illustrating an example display system according to various embodiments.

The terms used in the present disclosure will be briefly described and then the disclosure will be described in greater detail with reference to the drawings.

In the disclosure, general terms that have been widely used are selected, when possible, in consideration of functions of the disclosure, but non-general terms may be selected according to the intentions of technicians in the this art, precedents, or new technologies, etc. Some terms may be arbitrarily selected. In this case, the meanings of these terms will be explained in corresponding parts of the disclosure. Thus, the terms used herein should be defined not based on the names thereof but based on the meanings thereof and the whole context of the disclosure.

It will be understood that when an element is referred to as "including" another element, the element may further include other elements unless mentioned otherwise. Terms such as "unit", "module," and the like, when used herein, represent units for processing at least one function or operation, which may be implemented by hardware, software, or a combination of hardware and software.

Hereinafter, various example embodiments of the disclosure will be described in greater detail with reference to the accompanying drawings. However, the disclosure may be embodied in many different forms and is not limited to the embodiments of the disclosure set forth herein. For clarity, parts not related to explaining the disclosure may be omitted in the drawings, and like components are denoted by like reference numerals throughout the disclosure.

The term "user" used in embodiments of the disclosure may refer, for example, to a person who controls a function or operation of a system and examples thereof may include an administrator or an installer.

FIG. 1 is a diagram illustrating an example display system according to various embodiments.

Referring to FIG. 1, the display system may include a display device 100 and a content providing device 200.

The display device 100 according to an embodiment of the disclosure may be a TV but the TV is only an example and the display device 100 may be embodied in various forms including a display. For example, the display device 100 may be embodied as various types of electronic devices such as, for example, and without limitation, a cellular phone, a tablet PC, a digital camera, a camcorder, a laptop computer, a desk top computer, an e-book terminal, a digital broadcasting terminal, a personal digital assistant (PDA), a portable multimedia player (PMP), a navigation device, an MP3 player, a wearable device, or the like. For example, embodiments of the disclosure may be easily implemented by a display device with a large-sized display, such as a signage or a TV but are not limited thereto. The display device 100 may be a fixed or mobile type or a digital broadcast receiver capable of receiving digital broadcasts.

The display device 100 may be embodied as a curved display device with a screen having a curvature or a flexible display device with a screen, the curvature of which is adjustable, as well as a flat display device. An output resolution of the display device 100 may include, for example, a high-definition (HD) resolution, a full HD resolution, an ultra HD resolution, or a resolution clearer than the ultra HD resolution.

The content providing device 200 may include a device that provides content and is capable of reproducing content. Examples of the content providing device 200 may include, for example, and without limitation, a set-top box, a Blue-ray disc player, a DVD player, a game console, a digital camera, a camcorder, a streaming device, a home theater, an audio device, etc. The content providing device 200 may be any of various types of electronic devices such as, for example, and without limitation, a smart phone, a tablet PC, a mobile terminal, a videophone, an e-book reader, a desk top PC, a lap top PC, a netbook computer, a PDA, a portable multimedia player (PMP), a navigation device, an MP3 player, a wearable device, etc.

Content according to an embodiment of the disclosure may refer to multimedia content and include, but is not limited to, an image, video, audio data, text, a game, an application and the like.

The content may be content recorded on an optical disc such as a DVD or a Blu-ray disc. The content may be received from an external recording medium such as a universal serial bus (USB) memory or an external server. However, embodiments of the disclosure are not limited thereto.

The display device 100 and the content providing device 200 according to an embodiment of the disclosure may be connected to each other through wired or wireless communication. For example, the display device 100 may be connected to the content providing device 200 through, for example, and without limitation, a high-definition multimedia interface (HDMI) port, a mobile high-definition link (MHL) port, a USB port, a display port (DP), a thunderbolt port, a video graphics array (VGA) port, an RGB port, a D-subminiature (D-SUB) connector, a digital visual interface (DVI), a component jack, a PC port or the like to transmit video, audio data, and additional information to or receive transmit video, audio data, and additional information from the content providing device 200.

The display device 100 may be connected to the content providing device 200 through short-range wireless communication such as a wireless local area network (LAN) or Bluetooth to transmit video, audio data and additional information to or receive video, audio data and additional information from the content providing device 200.

The display device 100 connected to the content providing device 200 may output content transmitted thereto from the content providing device 200. Accordingly, the content providing device 200 according to an embodiment of the disclosure may be referred to as a reproducing device or a source device, and the display device 100 may be referred to as a sink device.

The display device 100 according to an embodiment of the disclosure may provide screens with various resolutions and aspect ratios. The display device 100 according to an embodiment of the disclosure may provide screens with aspect ratios of, for example, and without limitation, 4:3, 16:9, 16:10, 21:9, and 32:9, or the like, and provide screens with various resolutions according to aspect ratios. For example, screens with resolutions of, for example, and without limitation, 1280×720, 1366×768, 1600×900, 1920×1080, 2560×1440, 3840×2160, 5120×2880, and 7680×4320, or the like, may be provided at an aspect ratio of 16:9, and screens with resolutions of 2560×1080, 3440×1440, and 5120×2160 may be provided at an aspect ratio of 21:9. The display device 100 may display a black screen on some regions of the display to provide screens with various resolutions. However, embodiments of the disclosure are not limited thereto.

The content providing device 200 according to an embodiment of the disclosure may change a resolution of an image to be output to the display device 100 according to a requested resolution of the display device 100. For example, when a requested resolution of the display device 100 is a first resolution and the content providing device 200 supports the first resolution, the content providing device 200 may output an image at the first resolution to the display device 100, and when the requested resolution of the display device 200 is changed from the first resolution to a second resolution and the content providing device 200 supports the second resolution, the content providing device 200 may output an image at the second resolution to the display device 100. In this case, an error may occur in a second image having a changed resolution and displayed on the display device 100, and the display device 100 may compare the second image with a first image to automatically detect whether an error occurs in the second image.

When an error occurring in a displayed image is detected, the display device 100 may change the requested resolution again to the first resolution. Accordingly, the content providing device 200 may output the image at the first resolution to the display device 100 to prevent and/or reduce an error from occurring in the image. The display device 100 and the content providing device 200 will be described in greater detail below with reference to drawings.

Figure 2:
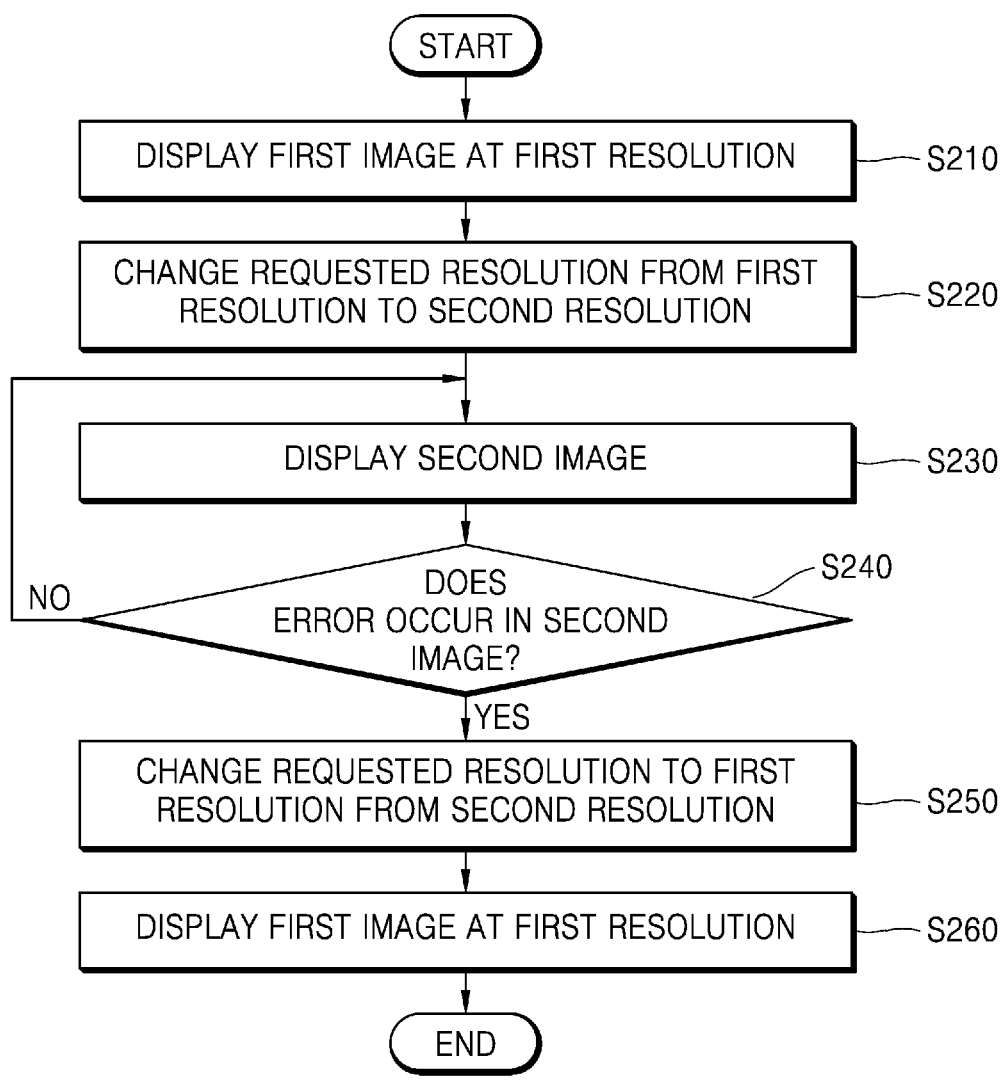
FIG. 2 is a flowchart illustrating an example method of operating a display device, according to various embodiments.

FIG. 2 is a flowchart of illustrating an example method of operating a display device according to various embodiments.

Referring to FIG. 2, the display device 100 may receive and display a first image output from the content providing device 200 connected thereto at a first resolution (S210).

When the display device 100 and the content providing device 200 according to an embodiment of the disclosure are connected, the display device 100 may transmit a requested resolution set to the content providing device 200, based on extended display identification data (EDID) information. In this case, the requested resolution set may include a plurality of resolutions and priorities may be assigned to the plurality of resolutions. One of the plurality of resolutions may be set to a recommended resolution and the remaining resolutions may be set to other resolutions.

The content providing device 200 may receive the requested resolution set from the display device 100 and determine whether the plurality of resolutions included in the requested resolution set are supportable by the content providing device 200 according to the priorities assigned to the plurality of resolutions. For example, when a first resolution assigned a first priority is supportable by the content providing device 200, the content providing device 200 may output an image at the first resolution to the display device 100. However, when the first resolution assigned the first priority is not supportable by the content providing device 200, an image at a second resolution assigned a second priority may be output to the display device 100.

When a recommended resolution among the plurality of resolutions included in the requested resolution set is supportable by the content providing device 200, the content providing device 200 may output an image at the recommended resolution to the display device 100. However, when the recommended resolution is not supportable by the content providing device 200, an image having one of the other resolutions among the plurality of resolutions may be output to the display device 100.

A first image displayed on the display device 100 may have a resolution and an aspect ratio that are predetermined (e.g., specified) according to an output resolution of the content providing device 100 and display characteristics of the display device 100. For example, the first image may have a first resolution of 3840×2160 corresponding to an aspect ratio of 16:9.

The display device 100 may change the requested resolution (or the requested resolution set) from the first resolution to the second resolution (S220). For example, the display device 100 may change a resolution of a displayed screen from 3840×2160 corresponding to an aspect ratio of 16:9 to a second resolution of 2560×1080 corresponding to an aspect ratio of 21:9, based on user input to switch to a wide screen mode. When a resolution of a displayed image is changed from 16:9 to 21:9, a black screen may be included in upper and lower regions of the image. However, embodiments of the disclosure are not limited thereto.

The content providing device 200 may be requested to output an image at the second resolution (e.g., 2560×1080 corresponding to an aspect ratio of 21:9) in response to switching of a screen mode. In this case, the display device 100 may change the requested resolution by changing the requested resolution set included in the EDID information.

When the requested resolution of the display device 100 is changed, the content providing device 200 may output a second image at the second resolution or another resolution to the display device 100 according to the changed requested resolution. For example, when the second resolution is supportable by the content providing device 200, the content providing device 200 may output the second image at the second resolution to the display device 100. On the other hand, when the second resolution is not supportable by the content providing device 200, the content providing device 200 may output the second image at a resolution other than the second resolution to the display device 100.

The display device 100 may receive and display the second image output from the content providing device 200 (S230).

The display device 100 may compare the first image and the second image with each other to determine whether an error has occurred in the second image (S240). For example, the display device 100 may compare image data of the first image displayed before the requested resolution is changed with image data of the second image displayed after the requested resolution is changed, and determine that an error has occurred in the second image when some of the image data of the first image is lost in the second image. The display device 100 may compare the aspect ratio of the first image with that of a region of the second image corresponding to the first image, and determine that an error has occurred in the second image when the aspect ratios are not the same. However, the above description merely provides non-limiting examples and the display device 100 according to an embodiment of the disclosure may determine whether an error has occurred in the second image in various ways.

When an error has occurred in the second image (Yes in S240), the display device 100 may change the requested resolution again to the first resolution from the second resolution (S250). For example, the display device 100 may end the wide screen mode and switch to a 16:9 screen mode. In addition, the display device 100 may display a message indicating that an error has occurred in the image and a screen mode is switched due to the occurrence of the error.

As a display resolution of the display device 100 is changed to the first resolution from the second resolution, the content providing device 200 may output a content image at the first resolution. The display device 100 may receive and display a content image at the first resolution and output from the content providing device 200 (S260).

Figure 3:
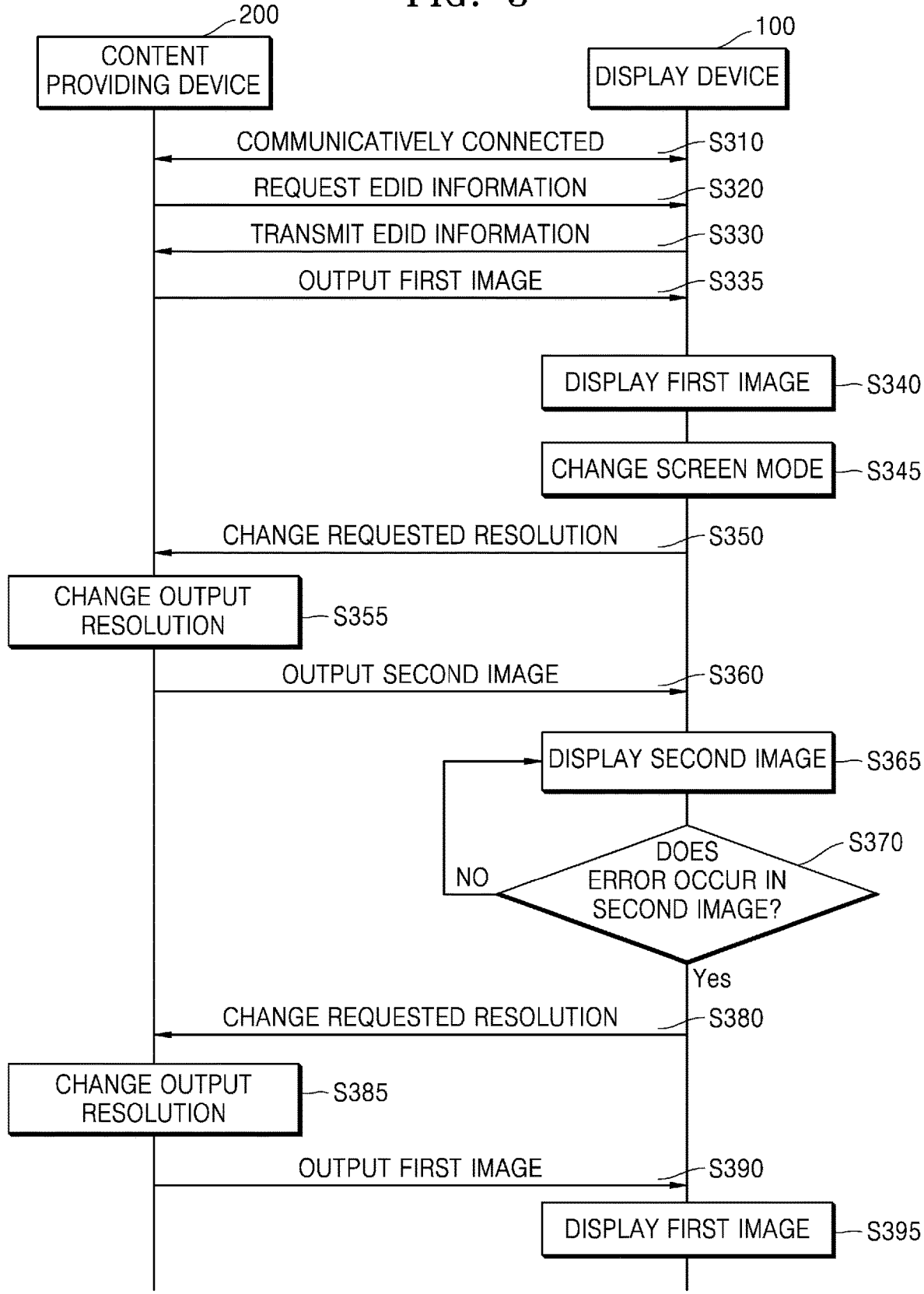
FIG. 3 is a signal flow diagram illustrating example operations between a content providing device and a display device, according to various embodiments.

FIG. 3 is a signal flow diagram illustrating example operations between a content providing device and a display device according to various embodiments.

Referring to FIG. 3, a display device 100 and a content providing device 200 may be connected to each other through various types of wired or wireless communication (e.g., communicatively coupled) (S310). For example, the display device 100 and the content providing device 200 may be connected through a HDMI cable but the disclosure is not limited thereto.

When the display device 100 and the content providing device 200 according to an embodiment of the disclosure are connected to each other, the content providing device 200 may access an EDID storage (e.g., an EDID read-only memory (ROM)) of the display device 100 to obtain EDID information recorded on the EDID storage. When the content providing device 200 requests the display device 100 to provide the EDID information (S320), the display device 100 may provide the EDID information recorded on the EDID storage to the content providing device 200 in response to the request (S330).

When the display device 100 and the content providing device 200 are communicatively connected, the display device 100 may access the EDID storage of the content providing device 200 to obtain the EDID information recorded on the EDID storage. When the display device 100 requests the content providing device 200 to provide the EDID information, the content providing device 200 may provide the EDID information recorded on the EDID storage to the display device 100 in response to the request.

In an embodiment of the disclosure, the EDID information may include, for example, and without limitation, information about the name, identification (ID), model name, manufacturer, manufacturing date, and serial number of each device, a maximum display size of an image, an aspect ratio, a horizontal frequency, a vertical frequency, a maximum resolution, gamma, whether a display power management signaling (DPMS) mode is supportable, supportable image modes, etc., and may further include additional information when needed. For example, the EDID information may further include at least one of requested image information (a requested resolution set including a plurality of resolutions) or image type information.

The content providing device 200 may determine an aspect ratio and an output resolution of an image to be output to the display device 100, based on information related to display characteristics of the display device 100 included in the EDID information of the display device 100 (e.g., a maximum display size of an image, an aspect ratio, a maximum resolution, a set resolution, a screen mode, etc.) and requested image information (the requested resolution set including the plurality of resolutions). The content providing device 200 may receive the requested resolution set from the display device 100 and determine whether the plurality of resolutions included in the requested resolution set are supportable by the content providing device 200 according to the priorities assigned to the plurality of resolutions. The content providing device 200 may determine an output resolution of an image to be output to the display device 100, based on whether the plurality of resolutions are supportable.

When a first resolution assigned a first priority among the plurality of resolutions included in the requested resolution set is supportable by the content providing device 200, the content providing device 200 may output a first image at the first resolution to the display device 100 (S335). For example, the content providing device 200 may transmit the first image to the display device 100 through wired or wireless communication connecting the content providing device 200 to the display device 100.

The display device 100 may display the first image received from the content providing device 200 (S340).

The display device 100 according to an embodiment of the disclosure may provide screen modes with various resolutions and aspect ratios and change a screen mode (a resolution of a displayed image), based, for example, on a user input (S345).

For example, the display device 100 may provide a 16:9 screen mode, a 21:9 screen mode, a 32:9 screen mode, or the like but embodiments of the disclosure are not limited thereto.

Based on a user input to switch to the 21:9 screen mode (a wide screen mode), a resolution of a displayed image may be changed from 3840×2160 corresponding to an aspect ratio of 16:9 to 2560×1080 corresponding to an aspect ratio of 21:9. When a resolution of a displayed image is changed from 16:9 to 21:9, a black screen may be included in upper and lower regions of the image. However, embodiments of the disclosure are not limited thereto.

When a screen mode of the display device 100 is changed, a resolution requested to the content providing device 200 may be changed (S350). The display device 100 may request the content providing device 200 to output an image at a certain resolution using the EDID information. For example, resolution information (e.g., the requested resolution set) among the EDID information stored in the EDID storage of the display device 100 may be changed. The content providing device 200 may detect a change of the requested resolution of the display device 100, based on the changed requested resolution set among the EDID information.

Accordingly, the content providing device 200 may change the output resolution, based on the requested resolution (S355). Thus, the content providing device 200 may output a second image at a second resolution or another resolution to the display device 100 (S360). For example, when the second resolution is supportable by the content providing device 200, the content providing device 200 may output the second image at the second resolution to the display device 100. On the other hand, when the second resolution is not supportable by the content providing device 200, the content providing device 200 may output the second image at a resolution other than the second resolution to the display device 100. The content providing device 200 may transmit the second image to the display device 100 through wired or wireless communication.

The display device 100 may display the second image received from the content providing device 200 (S365).

The display device 100 according to an embodiment of the disclosure may compare the first image and the second image with each other to determine whether an error has occurred in the second image (S370). For example, image data of the first image displayed before the requested resolution is changed with image data of the second image displayed after the requested resolution is changed, and determine that an error has occurred in the second image when some of the image data of the first image is lost in the second image. The display device 100 may compare the aspect ratio of the first image with that of a region of the second image corresponding to the first image, and determine that an error has occurred in the second image when the aspect ratios are not the same. However, the above description merely provides non-limiting examples and the display device 100 according to an embodiment of the disclosure may determine whether an error has occurred in the second image in various ways.

When an error has occurred in the second image (Yes in S370), the display device 100 may change the requested resolution again to the first resolution from the second resolution (S380). For example, the display device 100 may end a 21:9 screen mode (a wide screen mode), and change the requested resolution from 2560×1080 corresponding to an aspect ratio of 21:9 to 3840×2160 corresponding to an aspect ratio of 16:9.

When the requested resolution is changed, the requested resolution set among the EDID information stored in the EDID storage of the display device 100 may be changed, and the content providing device 200 may detect the change of the requested resolution of the display device 100, based on the changed requested resolution set.

Accordingly, the content providing device 200 may change an output resolution of an image to be output to the display device 100, based on the changed requested resolution (S385). The content providing device 200 may output a first image at the first resolution to the display device 100 (S390). For example, a 3840×2160 image with an aspect ratio of 16:9 may be output to the display device 100.

The display device 100 may display the first image received from the content providing device 200 on the display (S395).

Figure 4:
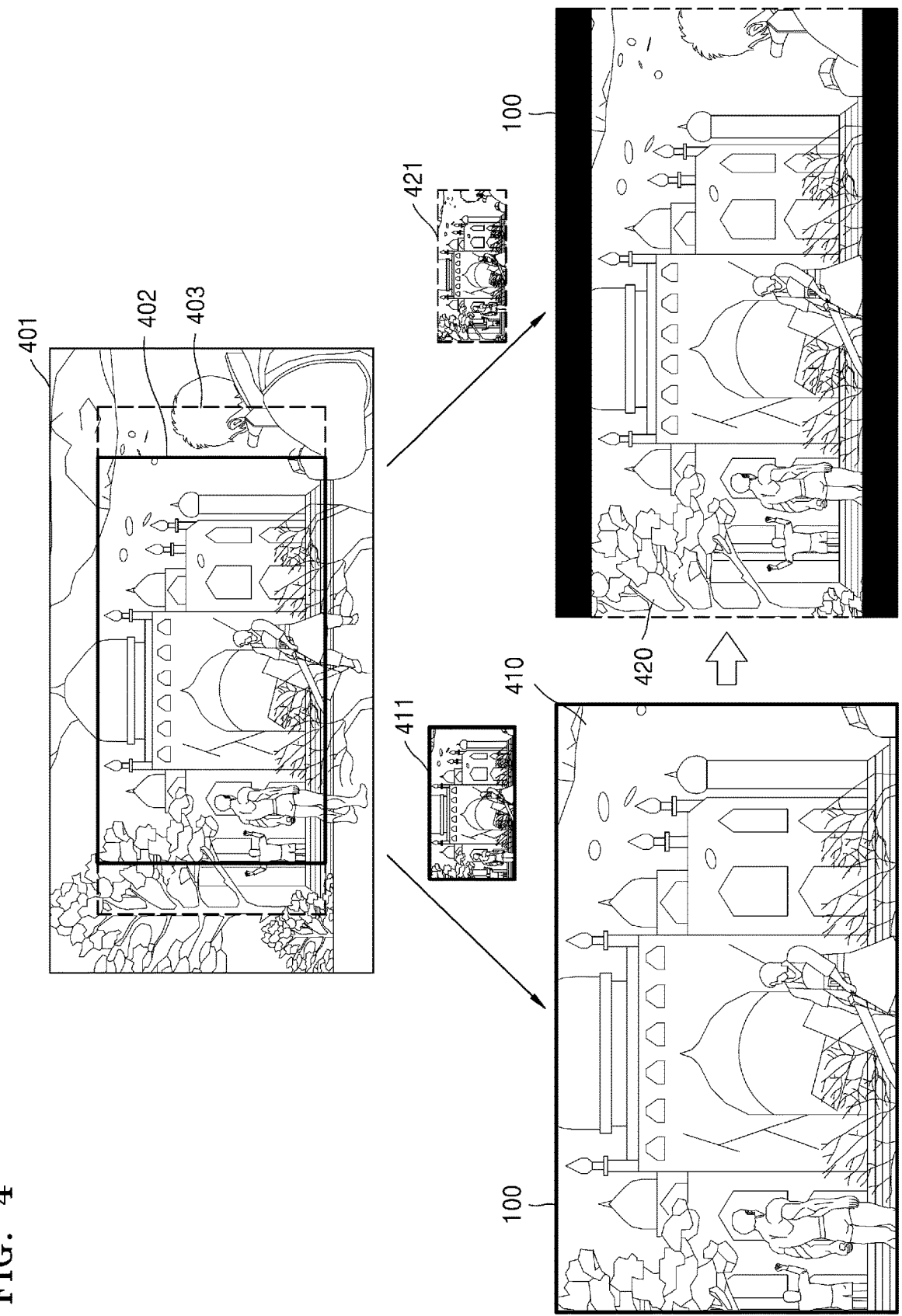
FIGS. 4 and 5 are diagrams illustrating examples of detecting whether an error occurs when a display device changes a requested resolution, according to various embodiments.
Figure 5:
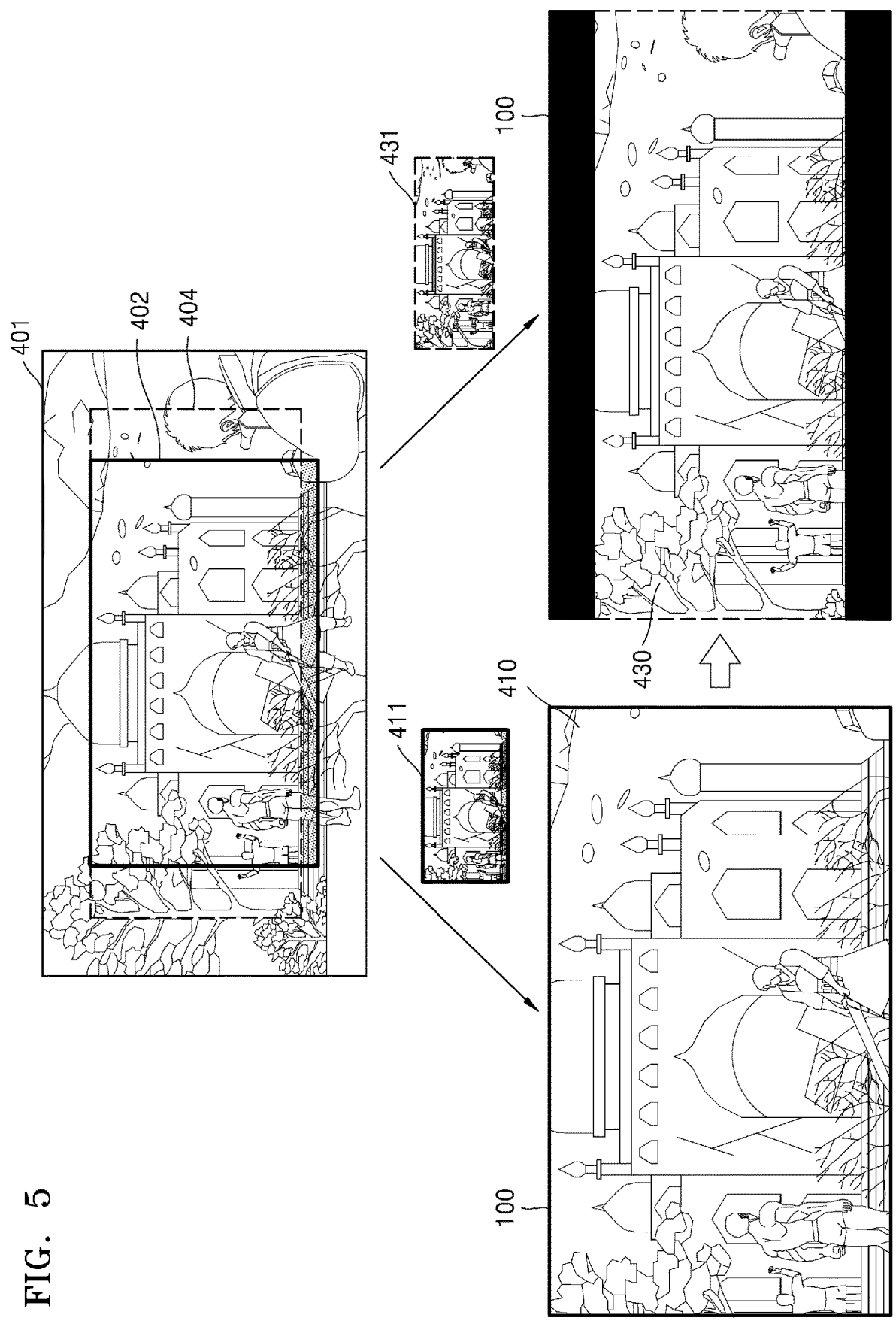

FIGS. 4 and 5 are diagrams illustrating examples of detecting whether an error occurs when a display device changes a requested resolution, according to various embodiments.

Referring to FIGS. 4 and 5, when a display device 100 requests a content providing device 200 to provide an image at a resolution of 3840×2160 and an aspect ratio of 16:9, the content providing device 200 may output a first image of content to the display device 100.

The content provided by the content providing device 200 according to an embodiment of the disclosure may include image data corresponding to a first region 401. When a requested resolution of the display device 100 is set to a first resolution (e.g., a resolution of 3840×2160 corresponding to an aspect ratio of 16:9, the content providing device 200 may transmit first image data 411 of the first region 401 corresponding to a second region 402 to the display device 100, based on the requested resolution of the display device 100. The content providing device 200 may support the first resolution and transmit the first image data 411 having the first resolution to the display device 100.

The display device 100 may receive the first image data 411 and display the first image 410, which corresponds to the first image data 411, at the first resolution (a resolution of 3840×2160 corresponding to an aspect ratio of 16:9).

The display device 100 according to an embodiment of the disclosure may control a screen such that a displayed image has a resolution of 2560×1080 corresponding to an aspect ratio of 21:9, based on a user input to switch to the 21:9 screen mode (the wide screen mode). However, the above description is merely an example, and the display device 100 may provide screen modes with various aspect ratios and resolutions.

When a screen mode of the display device 100 is changed, the display device 100 may change a resolution for which the content providing device 200 is to be requested. The content providing device 200 may transmit image data corresponding to the changed requested resolution to the display device 100.

For example, as shown in FIG. 4, when the requested resolution is changed to a second resolution (e.g., a resolution of 2560×1080 corresponding to an aspect ratio of 21:9), the content providing device 200 may transmit second image data 421 of the first region 401 corresponding to a third region 403 to the display device 100. The content providing device 200 may support the second resolution and transmit the second image data 421 at the second resolution to the display device 100.

The display device 100 may receive the second image data 421 and display the second image 420, which corresponds to the second image data 421, with the second resolution (a resolution of 2560×1080 corresponding to an aspect ratio of 21:9).

In this case, the display device 100 may compare the first image 410 displayed before the requested resolution is changed with the second image 420 displayed after the requested resolution is changed to determine whether an error has occurred in the second image 420.

For example, the display device 100 may compare the first image data 411 included in the first image 410 and the second image data 421 included in the second image 420 with each other, and determine that an error has occurred in the second image 420 when at least some of the first image data 411 is not included in the second image data 421.

Referring to FIG. 4, the first image data 411 is entirely included in the second image data 421 and thus the display device 100 may determine that an error does not occur in the second image 420.

On the other hand, as shown in FIG. 5, when the requested resolution is changed to the second resolution (e.g., a resolution of 2560×1080 corresponding to an aspect ratio of 21:9), the content providing device 200 may transmit third image data 431 of the first region 401 corresponding to a fourth region 404 to the display device 100.

The display device 100 may receive the third image data 431 and display a third image 430, which corresponds to the third image data 431, at the second resolution (a resolution of 2560×1080 corresponding to an aspect ratio of 21:9).

In this case, the display device 100 may compare the first image 410 displayed before the requested resolution is changed with the third image 430 displayed after the requested resolution is changed to determine whether an error has occurred in the third image 430.

For example, the display device 100 may compare the first image data 411 included in the first image 410 and the third image data 431 included in the third image 430 with each other, and determine that an error has occurred in the third image 430 when at least some of the first image data 411 is not included in the third image data 431 (see, e.g., shaded portion of 401 in FIG. 5).

Referring to FIG. 5, some data 510 of the first image data 411 is not included in the third image data 431 and thus the display device 100 may determine that an error has occurred in the third image 430.

However, in FIG. 5, it is determined that an error has occurred in the third image 430 when the entire first image data 411 is not included in the third image data 431 but embodiments are not limited thereto. For example, the display device 100 according to an embodiment of the disclosure may determine that an error does not occur in the second image 420 when a ratio of different data regions between image data of the first image 410 displayed on the display before the requested resolution is changed and image data of the second image 420 displayed on the display after the requested resolution is changed (e.g., a ratio of the different data regions between the image data of the first image 410 and the image data of the second image 420 to all of the regions of the first or second image 410 or 420) is less than a predetermined (e.g., specified) value, and may determine that an error has occurred in the second image 420 when the ratio of the different data regions is greater than or less than the predetermined (e.g., specified) value.

Figure 6:
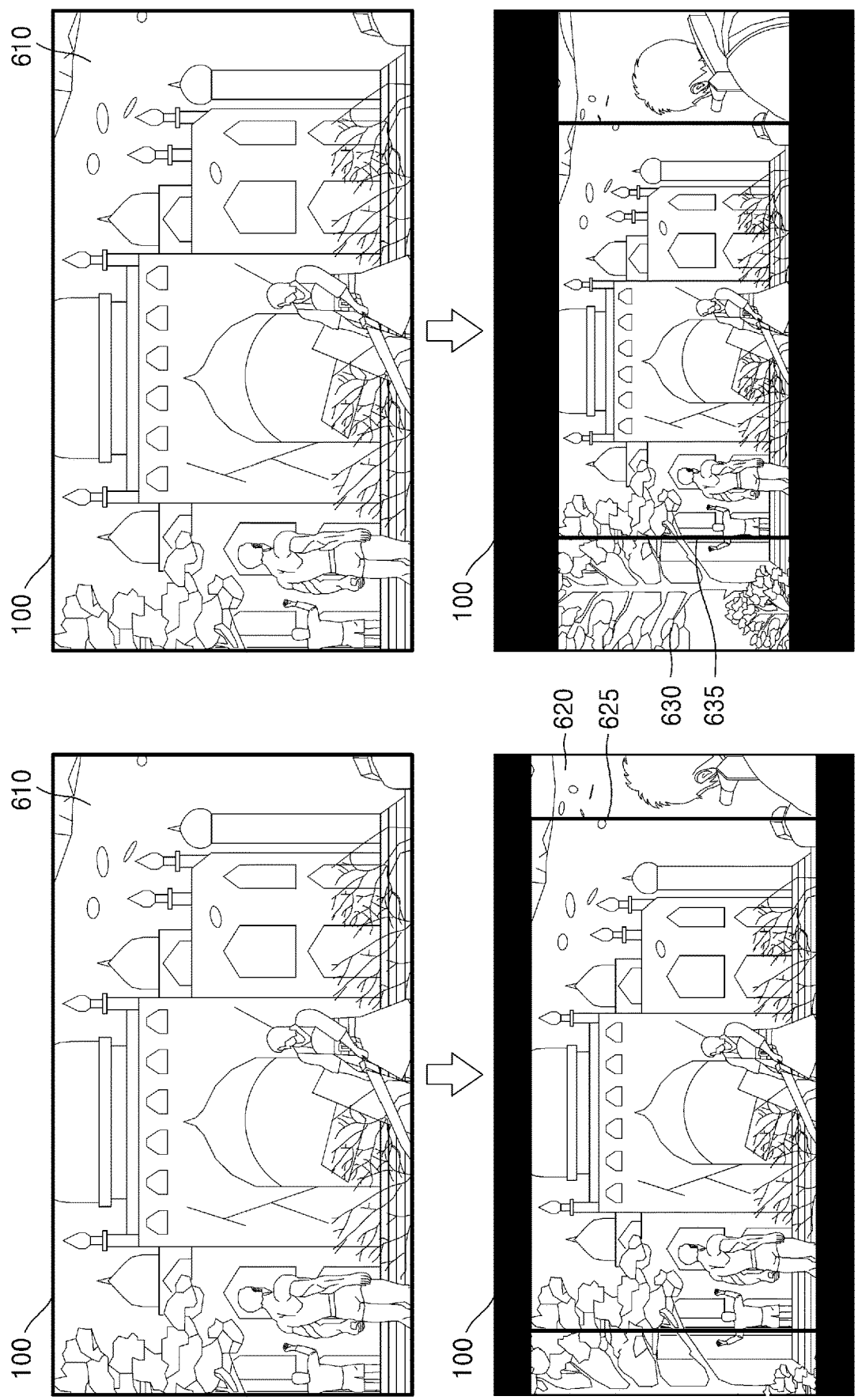
FIGS. 6 and 7 are diagrams illustrating examples of detecting whether an error occurs when a display device changes a requested resolution, according to various embodiments.
Figure 7:
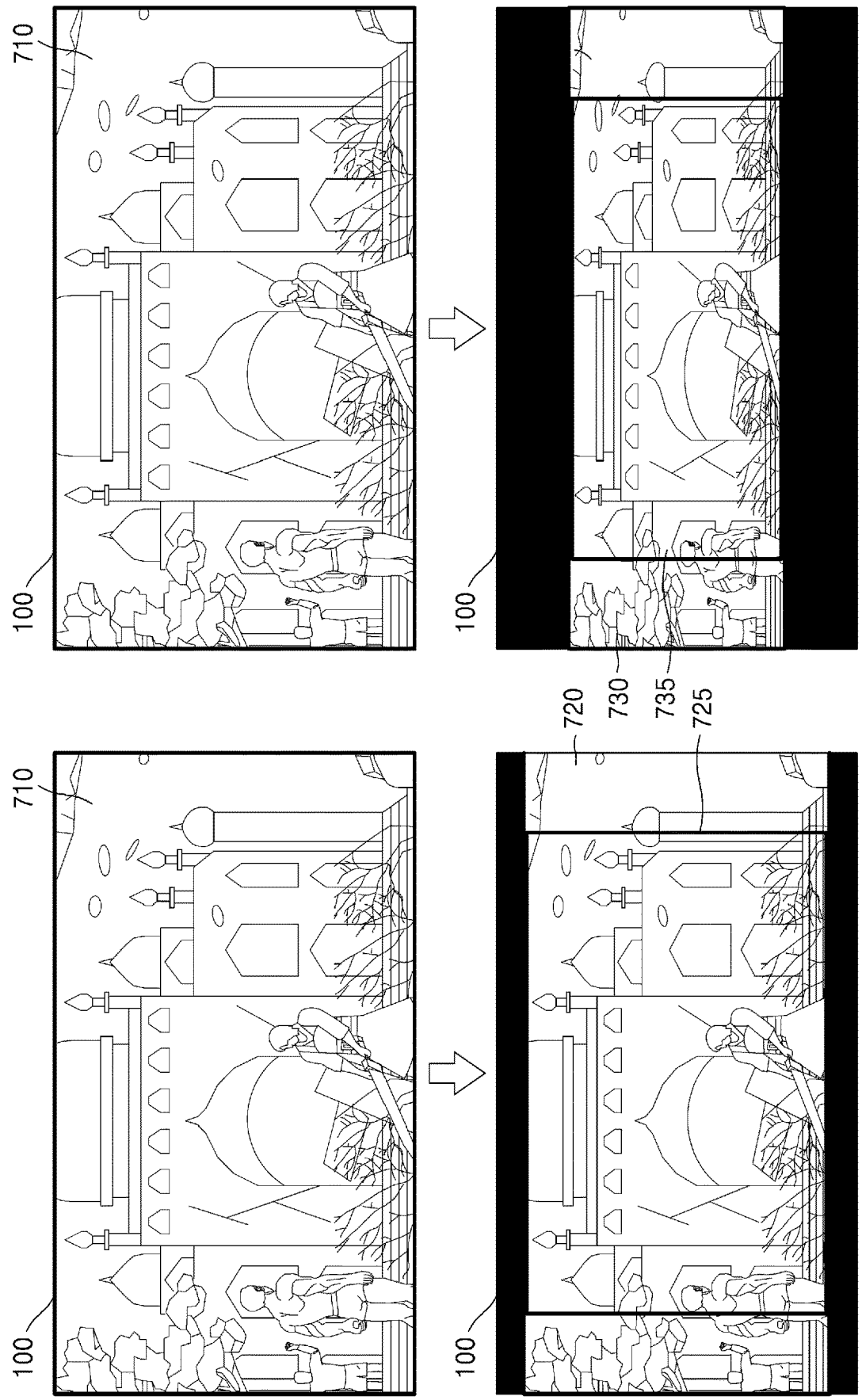

FIGS. 6 and 7 are diagrams illustrating examples of detecting whether an error occurs when a display device changes a requested resolution, according to various embodiments.

A display device 100 according to an embodiment of the disclosure may determine whether an error has occurred in a second image displayed after a requested resolution is changed by comparing a first image displayed before the requested resolution is changed with an aspect ratio of a third image of a region of a second image corresponding to the first image.

For example, referring to FIG. 6, the display device 100 may display a first image 610 at a first resolution (a resolution of 3840×2160 corresponding to an aspect ratio of 16:9). When a requested resolution of the display device 100 is changed to a second resolution (a resolution of 2560×1080 corresponding to an aspect ratio of 21:9), the display device 100 may display a second image 620 at the second resolution (the resolution of 2560×1080 corresponding to the aspect ratio of 21:9). In this case, image data corresponding to the first image 610 is entirely included in image data corresponding to the second image 620.

The display device 100 may compare an aspect ratio of the first image 610 with an aspect ratio of a first region 625 of the second image 620 corresponding to the first image 610, and determine that an error does not occur in the second image 620 when the aspect ratios match within a predetermined (e.g., specified) range. For example, when both the aspect ratio of the first image 610 and the aspect ratio of the first region 625 are 16:9 or when the aspect ratio of the first image 610 is 16:9 and the aspect ratio of the first region 625 is 16:10, the display device 100 may determine that an error does not occur in the second image 620.

As shown in FIG. 6, when the requested resolution of the display device 100 is changed from the first resolution (the resolution of 3840×2160 corresponding to the aspect ratio of 16:9) to a third resolution (a resolution of 3840×1080 corresponding to an aspect ratio of 32:9), the display device 100 may display a third image 630 at the third resolution (the resolution of 3840×1080 corresponding to the aspect ratio of 32:9). In this case, the image data corresponding to the first image 610 is entirely included in image data corresponding to the third image 630.

The display device 100 may compare the aspect ratio of the first image 610 with an aspect ratio of a second region 635 of the third image 630 corresponding to the first image 610, and determine that an error does not occur in the third image 630 when the aspect ratios match within a predetermined (e.g., specified) range. For example, when both the aspect ratio of the first image 610 and the aspect ratio of the second region 635 are 16:9 or when the aspect ratio of the first image 610 is 16:9 and the aspect ratio of the second region 635 is 16:10, the display device 100 may determine that an error does not occur in the third image 630.

Referring to FIG. 7, the display device 100 may display a first image 710 at a first resolution (a resolution of 3840×2160 corresponding to an aspect ratio of 16:9). When a requested resolution of the display device 100 is changed to a second resolution (a resolution of 2560×1080 corresponding to an aspect ratio of 21:9), the display device 100 may display a second image 720 at the second resolution (the resolution of 2560×1080 corresponding to the aspect ratio of 21:9).

For example, when the second resolution is supportable by the content providing device 200 but image data provided from software (e.g., a game application) executed in the content providing device 200 supports only image data corresponding to the first resolution, the content providing device 200 may transmit the second image 720, which is obtained by scaling the image data corresponding to the first resolution, to the second resolution to the display device 100. In this case, image data corresponding to the first image 710 and image data corresponding to the second image 720 are the same.

However, because an aspect ratio of displaying first image data is 16:9 and an aspect ratio of displaying second image data is 21:9 and do not match within a predetermined (e.g., specified) range, the display device 100 may determine that an error has occurred in the second image 720.

As shown in FIG. 7, when a display resolution of the display device 100 is changed from the first resolution (the resolution of 3840×2160 corresponding to the aspect ratio of 16:9) to a third resolution (a resolution of 3840×1080 corresponding to an aspect ratio of 32:9), the display device 100 may display a third image 730 at the third resolution (the resolution of 3840×1080 corresponding to the aspect ratio of 32:9). For example, when the third resolution is supportable by the content providing device 200 but image data provided from software (e.g., a game application) executed in the content providing device 200 supports only image data corresponding to the first resolution, the content providing device 200 may transmit the third image 730 obtained by scaling the image data corresponding to the first resolution to the third resolution to the display device 100. Accordingly, the first image data corresponding to the first image 710 and third image data corresponding to the third image 730 are the same.

However, because an aspect ratio of displaying the first image data is 16:9 and an aspect ratio of displaying the third image data is 32:9 and do not match within a predetermined (e.g., specified) range, the display device 100 may determine that an error has occurred in the third image 730.

The display device 100 according to an embodiment of the disclosure may set a comparison target area occupying the same proportion in an image displayed before a requested resolution is changed and an image displayed after the requested resolution is changed. For example, in FIG. 7, an entire region of the first image 710 with the aspect ratio of 16:9 and a first region 725 with an aspect ratio of 16:9 of the second image 720 may be compared with each other to determine whether the first image 710 and the second image 720 are identical to each other. In this case, when the first image 710 and the image of the first region 725 match within a predetermined (e.g., specified) range, the display device 100 may determine that an error does not occur in the second image 720. On the other hand, when the first image 710 and the image of the first region 725 do not match within the predetermined (e.g., specified) range, the display device 100 may determine that an error has occurred in the second image 720.

In addition, in FIG. 7, the entire region of the first image 710 with the aspect ratio of 16:9 and a second region 735 with an aspect ratio of 16:9 of the third image 730 may be compared with each other to determine whether the first image 710 and the third image 730 are identical to each other. In this case, when the first image 710 and the image of the second region 735 match within a predetermined (e.g., specified) range, the display device 100 may determine that an error does not occur in the third image 730. On the other hand, when the first image 710 and the image of the second region 735 do not match within the predetermined (e.g., specified) range, the display device 100 may determine that an error has occurred in the third image 730.

Figure 8:
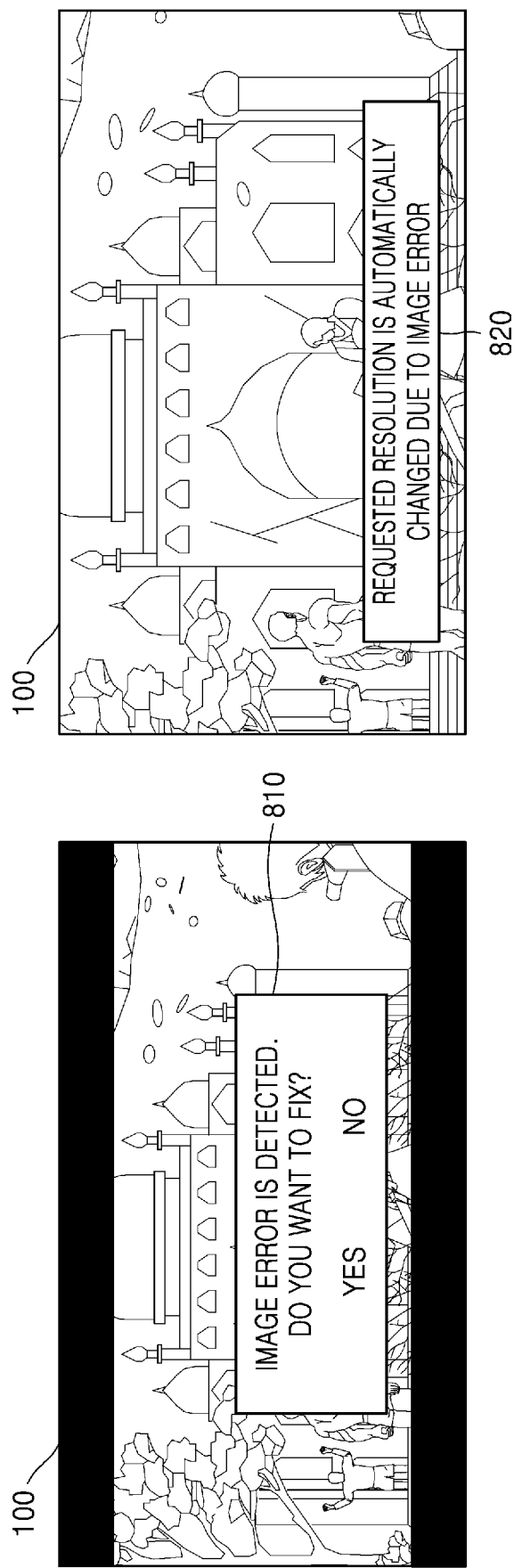
FIG. 8 is a diagram illustrating examples of outputting a notification message by a display device when an error occurs in a displayed image, according to various embodiments.

FIG. 8 is a diagram illustrating examples of outputting a notification message by a display device when an error occurs in a displayed image, according to various embodiments.

When a requested resolution of the display device 100 is changed to a second resolution from a first resolution and an image at the second resolution is output to the display device 100, it may be difficult for a user (a viewer) to recognize an error occurring in the image (the image at the second resolution) after the change of the requested resolution.

Thus, the display device 100 may generate a notification message notifying the occurrence of the error in the image (the image at the second resolution) after the change of the requested resolution.

Referring to FIG. 8, the display device 100 according to an embodiment of the disclosure may display a message 810 saying "an image error is detected" and inquiring whether to change the requested resolution again to an original resolution (the first requested resolution). As shown in FIG. 8, when an error occurs in the image (the image at the second resolution) after the change of the requested resolution, the display device 100 may change the requested resolution again to the original resolution (the first resolution). In addition, the display device 100 may display a message 820 notifying that the requested resolution is automatically changed due to the image error. The notification message may be displayed in the form of a pop-up message, but is not limited thereto and may be displayed with various types of content and in various forms.

Figure 9:
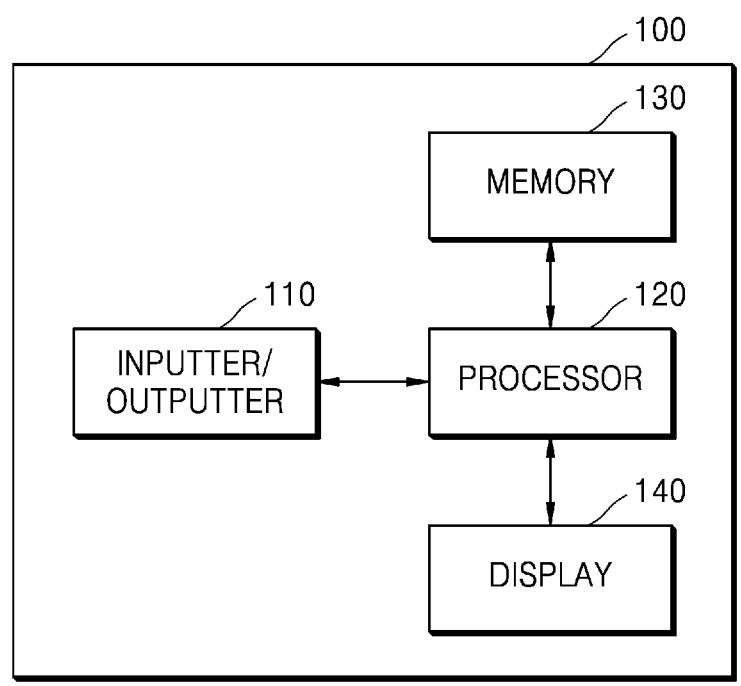
FIG. 9 is a block diagram illustrating an example configuration of a display device according to various embodiments.

FIG. 9 is a block diagram illustrating an example configuration of a display device according to various embodiments.

Referring to FIG. 9, an electronic device 100 according to an embodiment of the disclosure may include an inputter/outputter (e.g., including various interface circuitry) 110, a processor (e.g., including processing circuitry) 120, a memory 130, and a display 140.

In an embodiment of the disclosure, the inputter/outputter 110 may include various interface circuitry and transmits a video (e.g., a moving picture), an audio signal (e.g., voice or music), additional information (e.g., an electronic program guide), etc. to or receive a video, an audio signal, additional information, etc. from the outside of the display device 100. For example, the inputter/outputter 110 may include, without limitation, a high-definition multimedia interface (HDMI) port, a mobile high-definition link (MHL) port, a universal serial bus (USB) port, a display port (DP), a thunderbolt port, a video graphics array (VGA) port, an RGB port, a D-SUB connector, a digital visual interface (DVI), a component jack, a PC port, or the like. However, the inputter/outputter 110 is not limited thereto and a configuration and operation thereof may be variously implemented according to embodiments of the disclosure.

The display device 100 according to an embodiment of the disclosure may be connected to an external device through short-range wireless communication such as a wireless local area network (LAN) or Bluetooth to transmit video, an audio signal and additional information to or receive video, an audio signal and additional information from the external device.

The display device 100 according to an embodiment of the disclosure may be connected to the content device 200 through an HDMI port, and the inputter/outputter 110 may receive a request to provide EDID information from the content providing device 200 through a DDC channel and transmit EDID information of the display device 100 to the content providing device 200 in response to the request. In addition, the inputter/outputter 110 may receive an image output from the content providing device 200. The image received by the inputter/outputter 110 may be displayed on the display 140 under control of the processor 120.

In an embodiment of the disclosure, the display 140 generates a driving signal by converting an image signal, a data signal, an on-screen display (OSD) signal, a control signal or the like processed by the processor 120. The display 140 may be embodied, for example, and without limitation, as a plasma display panel (PDP), a liquid crystal panel (LCD), an organic light-emitting diode (OLED), a flexible display, or the like, or may be embodied as a three-dimensional (3D) display. The display 140 may be configured as a touch screen to be used as not only an output device but also an input device.

The display 140 according to an embodiment of the disclosure may provide screen modes with various resolutions and aspect ratios. For example, the display 140 may provide screen modes with aspect ratios of 4:3, 16:9, 16:10, 21:9, and 32:9 and provide screen modes with various resolutions according to aspect ratios. For example, screen modes with resolutions of 1280×720, 1366×768, 1600×900, 1920×1080, 2560×1440, 3840×2160, 5120×2880, and 7680×4320 may be provided at an aspect ratio of 16:9, and screen modes with resolutions of 2560×1080, 3440×1440, and 5120×2160 may be provided at an aspect ratio of 21:9.

In an embodiment of the disclosure, the processor 120 may include various processing circuitry and execute one or more programs stored in the memory 130. The processor 120 may include a single core, dual cores, triple cores, quad cores, and multiples thereof. The processor 120 may include a plurality of processors. For example, the processor 120 may be embodied as including a main processor (not shown) and a sub processor (not shown) that operates in a sleep mode.

In an embodiment of the disclosure, the memory 130 may store various types of data, programs, or applications for driving and controlling the display device 100.

A program stored in the memory 130 may include one or more instructions. The program (one or more instructions) or an application stored in the memory 130 may be executed by the processor 120.

The processor 120 according to an embodiment of the disclosure may execute one or more instructions stored in the memory 130 to change a requested resolution of the display 140 from a first resolution to a second resolution. For example, the processor 120 may change the requested resolution from the first resolution (a resolution of 3840×2160 corresponding to an aspect ratio of 16:9) to the second resolution (a resolution of 2560×080 corresponding to an aspect ratio of 21:9), based on a user input to switch to a wide screen mode. However, embodiments of the disclosure are not limited thereto.

The processor 120 may compare a first image displayed before the requested resolution is changed with a second image displayed after the requested resolution is changed to determine whether an error has occurred in the second image. For example, the processor 120 may compare image data of the first image displayed before the requested resolution is changed with image data of the second image displayed after the requested resolution is changed, and determine that an error has occurred in the second image when some of the image data of the first image is lost in the second image. The processor 120 may compare an aspect ratio of the first image with that of a region of the second image corresponding to the first image, and determine that an error has occurred in the second image when the aspect ratios are not the same. However, the above description provide only examples and the processor 120 according to an embodiment of the disclosure may determine whether an error has occurred in the second image in various ways.

When an error has occurred in the second image, the processor 120 may change the requested resolution of the display 140 to the first resolution again from the second resolution. For example, the processor 120 may end the wide screen mode and switch to a 16:9 screen mode. In addition, the processor 120 may control the display 140 to display a message indicating that an error has occurred in an image and a screen mode is switched due to the occurrence of the error.

Figure 10:
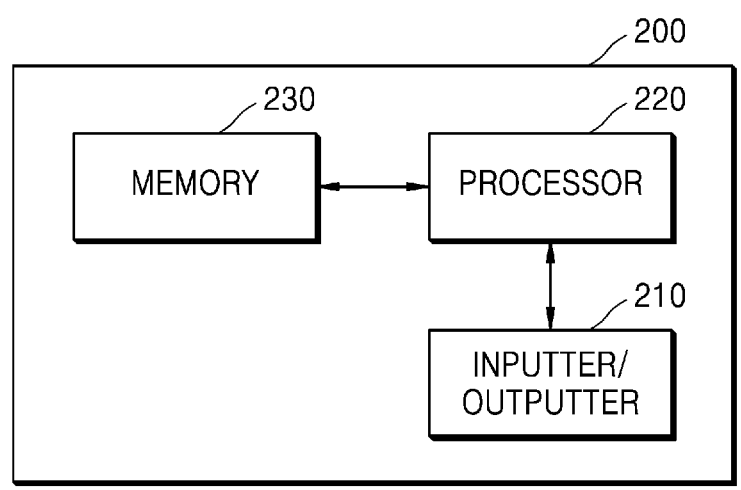
FIG. 10 is a block diagram illustrating an example configuration of a content providing device according to various embodiments.

FIG. 10 is a block diagram illustrating an example configuration of a content providing device according to various embodiments.

Referring to FIG. 10, the content providing device 200 according to an embodiment of the disclosure may include an inputter/outputter (e.g., including various interface circuitry) 210, a processor (e.g., including processing circuitry) 220, and a memory 230.

The inputter/outputter 210 according to an embodiment of the disclosure may include various interface circuitry and receive content from or transmit content to the content providing device 200 by being communicatively connected to an external server or an external device. For example, the inputter/outputter 210 may include an HDMI port, an MHL port, a USB port, a DP, a thunderbolt port, a VGA port, an RGB port, a D-SUB connector, a DVI, a component jack, or a PC port. However, the inputter/outputter 210 is not limited thereto and a configuration and operation thereof may be variously implemented according to embodiments of the disclosure. The content providing device 200 according to an embodiment of the disclosure may be connected to an external device through short-range wireless communication such as a wireless LAN or Bluetooth to transmit content to or receive content from the external device.

For example, the inputter/outputter 210 may be connected to the display device 100 so as to receive EDID information of the display device 100 from the display device 100 and output content to the display device 100.

The processor 220 according to an embodiment of the disclosure may include various processing circuitry and control overall operations of the content providing device 200. In detail, the processor 220 may control a process of outputting a content image, which is being reproduced in the content providing device 200, to the display device 100.

The processor 220 may execute one or more programs stored in the memory 230. In an embodiment of the disclosure, the memory 230 may store various types of data, programs, or applications for driving and controlling the content providing device 200.

A program stored in the memory 230 may include one or more instructions. The program (one or more instructions) or an application stored in the memory 230 may be executed by the processor 220.

The content providing device 200 according to an embodiment of the disclosure may receive content transmitted from an external device or an external server. The content providing device 200 may receive content from an external recording medium such as a USB memory or an HDD. Content recorded on an optical disc such as a DVD or a Blu-ray disc may be read.

The processor 220 according to an embodiment of the disclosure may execute one or more instructions stored in the memory 230 to reproduce content and may be implemented in various forms according to embodiments of the disclosure. For example, the processor 220 may process content data received by the content providing device 200.

The processor 220 may determine an aspect ratio and an output resolution of a content image to be output to the display device 100, based on information (e.g., a maximum display size of an image, an aspect ratio, a maximum resolution, a set resolution, a screen mode, etc.), which is related to display characteristics of the display device 100 and included in EDID information received from the display device 100 connected to the content providing device 200, and a requested resolution. For example, when the requested resolution of the display device 100 is changed, the processor 220 may change an output resolution of the content providing device 200, based on the changed request resolution.

Figure 11:
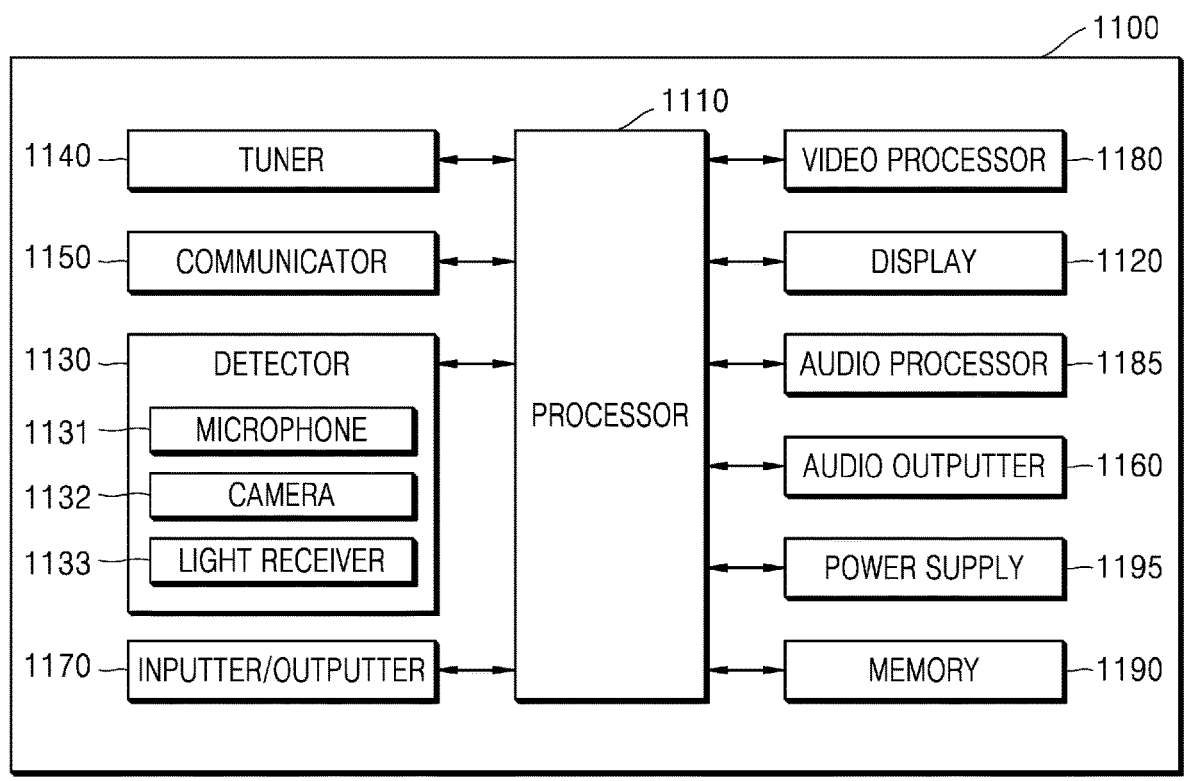
FIG. 11 is a block diagram illustrating an example configuration of a display device according to various embodiments.

FIG. 11 is a block diagram illustrating an example configuration of a display device according to various embodiments.

Referring to FIG. 11, a display device 1100 may be an embodiment of the display device 100 described above with reference to FIGS. 1 to 9.

Referring to FIG. 11, the display device 1100 according to an embodiment of the disclosure may include a tuner 1140, a processor (e.g., including processing circuitry) 1110, a display 1120, a communicator (e.g., including communication circuitry) 1150, a detector (e.g., including detection circuitry) 1130, an inputter/outputter (e.g., including interface circuitry) 1170, a video processor (e.g., including video processing circuitry) 1180, an audio processor (e.g., including audio processing circuitry)_1185, an audio outputter (e.g., including audio output circuitry) 1160, a memory 1190, and a power supply 1195.

The inputter/outputter 1170 of FIG. 11 may be a component corresponding to the inputter/outputter 110 of FIG. 9, the processor 1110 of FIG. 11 may be a component corresponding to the processor 120 of FIG. 9, the memory 1190 of FIG. 11 may be a component corresponding to the memory 130 of FIG. 9, and the display 1120 of FIG. 11 may be a component corresponding to the display 140 of FIG. 9. Therefore, a description of the above components that are the same as or similar to those described above may not be repeated.

In an embodiment of the disclosure, the tuner 1140 may tune and select only a frequency of a channel to be received by the display device 1000 from among various radio wave components by performing amplification, mixing, resonance or the like on a broadcast signal received via wire or wirelessly. The broadcast signal includes audio data, a video and additional information (e.g., an electronic program guide (EPG)).

The tuner 1140 may receive broadcast signals from various sources such as terrestrial broadcasting, cable broadcasting, satellite broadcasting, Internet broadcasting, and the like. The tuner 1140 may receive a broadcast signal from a source such as analog broadcasting or digital broadcasting.

In an embodiment of the disclosure, the communicator 1150 may include various communication circuitry and transmit data or signals to and receive data or signals from an external device or a server under control by the processor 1110. The processor 1110 may transmit content to or receive content from an external device connected thereto via the communicator 1150, download an application from the external device, or perform web browsing. The communicator 1150 may transmit or receive data or a signal by at least one method of a wireless LAN (e.g., Wi-Fi), Bluetooth or Wired Ethernet according to the performance or configuration of the display device 100.

The detector 1130 according to an embodiment of the disclosure may include various detection circuitry and detect a user's voice, image or interaction and include a microphone 1131, a camera 1132, and a light receiver 1133.

The microphone 1131 receives a user's uttered voice. The microphone 1131 may convert received voice into an electric signal and output the electric signal to the processor 1110. The user's voice may include, for example, voice corresponding to a menu or function of the display device 1100.

The camera 1132 may receive an image (e.g., a series of frames) corresponding to a user's motion, including a gesture, within a camera recognition range. The processor 1110 may select a menu displayed on the display device 1100 using a received result of recognition of a motion or may perform control corresponding to the result of recognition of the motion.

The light receiver 1133 receives an optical signal (including a control signal) from an external control device through an optical window (not shown) of a bezel of the display 1120 or the like. The light receiver 1133 may receive an optical signal corresponding to a user input (e.g., touching, pressing, a touch gesture, voice, or a motion) from a control device. The control signal may be extracted from the received optical signal under control by the processor 1110.

The processor 1110 may include various processing circuitry and controls overall operations of the display device 1100 and a signal flow between the internal components of the display device 1100, and performs a data processing function. The processor 1110 may execute an operation system (OS) and various applications stored in the memory 1190 when there is a user input or a preset and stored condition is satisfied.

The processor 1110 may include a random access memory (RAM) to be used to store a signal or data input from the outside of the display device 1100 or used as a storage region corresponding to various operations performed by the display device 1100, a read-only memory (ROM) storing a control program for control of the display device 1100, and a processor.

The video processor 1180 may include various video processing circuitry and processes video data received by the display device 1100. The video processor 1180 may perform various image processing operations, such as decoding, scaling, noise reduction, frame rate conversion, and resolution conversion, on the video data.

The display 1120 generates a driving signal by converting an image signal, a data signal, an on-screen display (OSD) signal, a control signal or the like processed by the processor 1110. The display 1120 may be embodied, for example, and without limitation, as a plasma display panel (PDP), a liquid crystal panel (LCD), an organic light-emitting diode (OLED) display, a flexible display, or the like or may be embodied as a three-dimensional (3D) display. The display 1120 may be configured as a touch screen to be used as not only an input device but also an input device.

The audio processor 1185 may include various audio processing circuitry and processes audio data. The audio processor 1185 may perform various processing operations, such as decoding, amplification, and noise reduction, on the audio data. The audio processor 1185 may include a plurality of audio processing modules to process audio data corresponding to a plurality of pieces of content.

The audio outputter 1160 may include various audio outputting circuitry and outputs audio data included in a broadcast signal received through the tuner 1140 under control by the processor 1110. The audio outputter 1160 may output audio data (e.g., voice or sound) input through the communicator 1150 or the inputter/outputter 1170. The audio outputter 1160 may output audio data stored in the memory 1190 under control by the processor 1110. The audio outputter 1160 may include at least one of a speaker, a headphone output terminal, or a Sony/Philips Digital Interface (S/PDIF) output terminal.

The power supply 1195 supplies power from an external power source to the internal components of the display device 1100 under control by the processor 1110. Alternatively, the power supply 1195 supplies power output from one or more batteries (not shown) included in the display device 1100 to the internal components under control by the processor 1110.

The memory 1190 may store various types of data, programs, or applications for driving and controlling the display device 1100 under control by the processor 1110. Although not shown, the memory 1190 may include various modules including various executable program instructions including, for example, and without limitation, a broadcast receiving module, a channel control module, a volume control module, a communication control module, a voice recognition module, a motion recognition module, an optical receiving module, a display control module, an audio control module, an external input control module, a power control module, a power control module of an external device connected wirelessly (e.g., Bluetooth), a voice database (DB), or a motion DB. The modules and DBs (not shown) of the memory 1190 may be embodied as software to perform by the display device 1100 a broadcast reception control function, a channel control function, a volume control function, a communication control function, a voice recognition function, a motion recognition function, an optical reception control function, a display control function, an audio control function, an external input control function, a power control function, or a power control function of an external device connected wirelessly (e.g., Bluetooth). The processor 1110 may perform each of these functions using the software stored in the memory 1190.

The block diagrams of the display devices 100 and 1000 illustrated in FIGS. 9 and 11 are block diagrams illustrating non-limiting example configurations according to various example embodiments of the disclosure. The components of the block diagrams may be combined together or omitted or new components may be added according to the specifications of the display devices 100 and 1100 that are actually implemented. That is, two or more components may be combined into one component or one component may be divided into two or more components as needed. A function performed in each block is only provided to explain embodiments of the disclosure and the scope of the disclosure should not be construed as being limited to specific operations or devices.

An operating method of a display device, according to an embodiment of the disclosure, may be embodied in the form of program instructions executable through various computer means and recorded on a non-transitory computer-readable recording medium. The non-transitory computer-readable recording medium may include program instructions, data files, data structures, and the like solely or in combination. The program instructions recorded on this medium may be specially designed and configured for the disclosure or may be well-known and available to those of ordinary skill in the field of computer software. Examples of the non-transitory computer-readable recording medium include magnetic media such as hard disks, floppy disks, and magnetic tapes, optical media such as CD-ROMs and DVDs, magneto-optical media such as floptical disks, and hardware devices, such as ROMs, RAMs, and flash memory, which are specifically configured to store and execute program instructions. Examples of the program instructions include not only machine code generated by a compiler but also high-level language code executable by a computer using an interpreter or the like.

Operating methods of a display device according to various example embodiments of the disclosure set forth herein may be provided by being included in a computer program product. The computer program product may be traded as a product between a seller and a purchaser.

The computer program product may include an S/W program and a computer-readable storage medium storing the S/W program. For example, the computer program product may include a product (e.g., a downloadable application) in the form of an S/W program distributed electronically by the manufacturer of an electronic device or through an electronic market (e.g., Google Play Store or App Store). For electronic distribution of the computer program product, at least part of the S/W program may be stored in a storage medium or temporarily generated. In this case, the storage medium may be a storage medium of a server of the manufacturer, a server of the electronic market, or a storage medium of a relay server that temporarily stores the S/W program.

The computer program product may include a storage medium of a server or a storage medium of a client device in a system that includes the server and the client device. When there is a third device (e.g., a smart phone) communicatively connected to the server or the client device, the computer program product may include a storage medium of the third device. The computer program product may include the software program transmitted from the server to the client device or the third device or transmitted from the third device to the client device.

In this case, one of the server, the client device, and the third device may execute the computer program product to perform the methods according to the embodiments of the disclosure set forth herein. Two or more of the server, the client device, and the third device may execute the computer program product to distributively perform the methods according to the embodiments of the disclosure set forth herein.

For example, the server (e.g., a cloud server or an artificial intelligence server) may execute the computer program product stored therein to control the client device communicatively connected to the server to perform the methods according to the embodiments of the disclosure set forth herein.

While the disclosure has been illustrated and described with reference to various example embodiments, it will be understood that the various example embodiments are intended to be illustrative, not limiting. It will be further understood, that various modifications and improvements made by those of ordinary skill in the art using the disclosure and included in the following claims without departing from the true spirit and full scope of the disclosure. It will also be understood that any of the embodiment(s) described herein may be used in conjunction with any other embodiment(s) described herein.

What is claimed is:

1. A display device comprising:
    an inputter/outputter comprising circuitry configured to request a content providing device to provide content at a first resolution and receive a first image at the first resolution from the content providing device;
    a display configured to display the first image;
    a memory storing one or more instructions; and
    a processor configured to execute the one or more instructions stored in the memory to:

change a resolution requested to the content providing device from the first resolution to a second resolution;

control the display to receive a second image from the content providing device and display the received second image in response to the change of the requested resolution;

determine whether an error occurs in the displayed second image; and change the requested resolution from the second resolution to the first resolution based on an error occurring in the second image.

2. The display device of claim 1, wherein the processor is further configured to execute the one or more instructions to change the requested resolution, based on an input to switch to a wide screen mode.

3. The display device of claim 1, wherein a first aspect ratio of the first resolution and a second aspect ratio of the second resolution are different from each other.

4. The display device of claim 1, wherein the processor is further configured to execute the one or more instructions to compare the first image and the second image with each other to determine whether an error occurs in the second image.

5. The display device of claim 4, wherein the processor is further configured to execute the one or more instructions to determine that an error occurs in the second image based on image data included in the first image not being included in the second image.

6. The display device of claim 4, wherein the processor is further configured to execute the one or more instructions to: compare a first aspect ratio of the first image with a second aspect ratio of a region of the second image corresponding to the first image, and determine that an error occurs in the second image based on the first aspect ratio and the second aspect ratio not matching within a specified range.

7. The display device of claim 1, wherein the inputter/outputter comprises a high-definition multimedia interface (HDMI), and the first image and the second image are configured to be received from the content providing device through the HDMI.

8. The display device of claim 1, wherein the processor is further configured to execute the one or more instructions to control the inputter/outputter to transmit information about the requested resolution to the content providing device through extended display identification (EDID) information.

9. The display device of claim 1, wherein the processor is further configured to execute the one or more instructions to control the display to display an image at the first resolution based on an error occurring in the second image.

10. The display device of claim 1, wherein the processor is further configured to execute the one or more instructions to control the display to output a message notifying about occurrence of an error based on the error occurring in the second image.

11. A method of operating a display device, the method comprising:

requesting a content providing device to provide content at a first resolution and receiving a first image at the first resolution from the content providing device;

displaying the first image;

changing a resolution requested to the content providing device from the first resolution to a second resolution;

receiving a second image from the content providing device in response to the change of the requested resolution;

displaying the received second image;

determining whether an error occurs in the displayed second image; and changing the requested resolution from the second resolution to the first resolution based on an error occurring in the second image.

12. The method of claim 11, wherein the changing of the requested resolution of the display from the first resolution to the second resolution comprises changing the requested resolution, based on an input to switch to a wide screen mode.

13. The method of claim 11, wherein a first aspect ratio of the first resolution and a second aspect ratio of the second resolution are different from each other.

14. The method of claim 11, wherein the determining of whether an error occurs in the displayed second image comprises comparing the first image and the second image with each other to determine whether an error occurs in the second image.

15. A non-transitory computer-readable recording medium having stored thereon a program for performing the method of claim 11.

* * * * *